(12) United States Patent
Flores-Bamaca et al.

(10) Patent No.: US 10,100,800 B2
(45) Date of Patent: Oct. 16, 2018

(54) COLD START FEATURE FOR VEHICLE ELECTRONIC PUMP

(71) Applicant: MAGNA ELECTRONICS INC., Auburn Hills, MI (US)

(72) Inventors: Oscar Flores-Bamaca, Macomb, MI (US); Kenneth J. Baize, Shelby Township, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/722,147

(22) Filed: Oct. 2, 2017

(65) Prior Publication Data

US 2018/0094615 A1   Apr. 5, 2018

Related U.S. Application Data

(60) Provisional application No. 62/403,867, filed on Oct. 4, 2016.

(51) Int. Cl.
*G05D 23/00* (2006.01)
*F02N 19/04* (2010.01)
(Continued)

(52) U.S. Cl.
CPC ............. *F02N 19/04* (2013.01); *B60W 10/08* (2013.01); *F01M 5/021* (2013.01); *F01P 11/20* (2013.01);
(Continued)

(58) Field of Classification Search
CPC . G05B 5/00; G05D 23/00; H02H 7/08; H02P 1/00; H02P 3/00; H02P 6/00; H02P 21/00; H02P 1/46; H02P 3/18; H02P 27/04; H02P 41/02; H02P 23/00; F04B 49/00; F04B 49/02; F04B 45/00; F04B 45/033; F04B 45/047; F04B 45/067; F04B 41/06; F04B 49/10; F04B 49/06; F04B 19/24; F04B 39/04; F04B 39/06; F04B 17/00; F04B 35/00; F04B 35/04; F04B 35/02; F04B 41/04; F01B 23/08; F02D 41/064
(Continued)

(56) References Cited

U.S. PATENT DOCUMENTS 8,145,384 B2 * 3/2012 Murahashi .......... F16H 57/0434
                                              180/339
2003/0094923 A1   5/2003 Emori et al.
(Continued)

FOREIGN PATENT DOCUMENTS

DE        102012210616 A1    12/2013

*Primary Examiner* — Antony M Paul
(74) *Attorney, Agent, or Firm* — Honigman Miller Schwartz and Cohn, LLP

(57) ABSTRACT

A system for starting a vehicle in cold temperatures includes a temperature sensor and a motor operable to drive at least one electrically operated pump to pump fluid. The motor provides a motor signal indicative of an operating condition of the motor. Responsive to (i) a temperature sensed by the temperature sensor being below a threshold level and (ii) the motor signal being indicative of a stall condition of the motor, the system enters a fluid heating mode. When operating in the fluid heating mode, the system generates heat in the windings of the motor and transfers heat from the motor to the fluid being pumped by the pump.

20 Claims, 4 Drawing Sheets

(51) Int. Cl.
*F01M 5/02* (2006.01)
*F02D 41/06* (2006.01)
*B60W 10/08* (2006.01)
*F01P 11/20* (2006.01)

(52) U.S. Cl.
CPC ...... *F02D 41/064* (2013.01); *B60L 2240/485* (2013.01); *F02D 2200/023* (2013.01)

(58) Field of Classification Search
USPC ... 417/1, 2, 10, 32, 43, 44.1, 292, 321, 228, 417/237, 453; 123/453; 318/400.01, 318/700, 701, 727, 779, 799, 801, 471, 318/472, 430, 432
See application file for complete search history.

(56) References Cited

U.S. PATENT DOCUMENTS

| | | |
|---|---|---|
| 2010/0052619 A1 | 3/2010 | Bishop et al. |
| 2014/0285936 A1 | 9/2014 | Garbacik et al. |
| 2015/0048798 A1 | 2/2015 | Godo et al. |
| 2015/0340743 A1 | 11/2015 | Fink |

\* cited by examiner

| Software Phase | | | | | | | |
|---|---|---|---|---|---|---|---|
| Software version (number) | Chamber Temp. (°C) | Soak Time (Hours) | Oil flow during alignment (lpm) | Steady speed (rpm) | Time to steady speed (min:secs) | Initial Pressure at steady speed (PSI) | Time when Pressure builds (min:secs) | Time to closed loop control (min:ss) |
| 6.0.5.0 baseline | -40 | 12 hrs. | NA | 500 | 24 mins 48 secs | 2 | 21 mins 40 secs (1.22 PSI) | 25 mins 36 secs |
| 6.0.5.0 baseline | -40 | 4 hrs. | NA | 450 | 20 mins 22 secs | 0.8 | 20 mins 22 secs | 24 min 7 secs |
| 6.0.11.0 baseline | -40 | 4 hrs. | 8A | 400 | 24 mins 56 secs | 1.71 | 24 mins 56 secs | 26 min 28 secs |
| 6.0.12.0 NHA | -40 | 4 hrs. | 8A | 520 | 7 min | 0.26 | 16 secs (2.72 PSI) | 7 mins 22 secs |
| 6.0.12.0 NHA | -40 | 12 hrs. | NA | 520 | 7 min 6 secs | 0.56 | 25 secs (6 PSI) | 7 mins 38 secs |
| 6.0.16.0 NHA | -40 | 12 hrs. | NA | 480 | 6 min 18 secs | 0.1 (0 PSI peak) | 14 secs (2.41 PSI) | 6 min 34 secs |

COMPARATIVE TABLE AUTO COLD START ME TESTING

| Software version | ECU Soak time | Initial Temperatures | | | | APSICS (Auto Cold Start) Comparisons | | |
|---|---|---|---|---|---|---|---|---|
| | | µP temp | Ambient | ATF Oil Temp | Time to complete APS1CS | ECU Temp when exit (°C) | Time when pressure starts (>10 psi) | |
| 6.0.11.0 baseline | 4 hrs | -43 | -39.8 | -40.4 | 26 min 26 secs | -1 | 24 secs 65 secs | |
| 8.0 2.01M4 | 4 hrs | -44 | -39.7 | -40.3 | 7 min 22 secs | 1 | 16 secs (2.72 PSI) | |
| 8.0 2.01M4 | 12 hrs | -44 | -39.8 | -40.3 | 7 min 24 secs | 1 | 25 secs (5 PSI) | |
| 8.0 16.01M4 | 12 hrs | -44 | -39.7 | -40.3 | 6 min 34 secs | 1 | 14 secs (2.41 PSI) | |

COLD START FEATURE FOR VEHICLE ELECTRONIC PUMP

CROSS REFERENCE TO RELATED APPLICATION

The present application claims the filing benefits of U.S. provisional application Ser. No. 62/403,867, filed Oct. 4, 2016, which is hereby incorporated herein by reference in its entirety.

FIELD OF THE INVENTION

The present invention relates generally to electrically powered motors of vehicles and, more particularly, to an electrically powered motor for a transmission oil pump for a vehicle.

BACKGROUND OF THE INVENTION

Vehicles use electrically powered motors that are operated for various functions of the vehicles. For example, an electrically powered motor may be used to power or drive or operate a transmission oil pump at a transmission of the vehicle.

SUMMARY OF THE INVENTION

The present invention provides a system for heating fluid for a pump of a vehicle (such as an internal combustion engine vehicle and/or an electrically operated vehicle, such as an electric vehicle or a hybrid vehicle or the like). The system includes a temperature sensor and a motor operable to drive at least one electrically operated pump to pump fluid (such as for a transmission of the vehicle). The motor provides a motor signal indicative of an operating condition of the motor. Responsive to (i) a temperature sensed by the temperature sensor being below a threshold level and (ii) the motor signal being indicative of a stall condition of the motor, the system enters a fluid heating mode. When operating in the fluid heating mode, the system generates heat in the windings of the motor and transfers heat (such as via heat conduction) from the motor to the fluid being pumped by the pump.

After heat is conductively transferred to the fluid, the system may operate in a startup mode to start the motor. The system may switch from the fluid heating mode to the startup mode following a threshold period of time after entering the fluid heating mode. When operating in the startup mode, the system attempts to start the motor and switches back to the fluid heating mode if (i) the temperature sensed by said temperature sensor is below the threshold level and (ii) the motor signal is indicative of a stall condition of the motor.

These and other objects, advantages, purposes and features of the present invention will become apparent upon review of the following specification in conjunction with the drawings.

BRIEF DESCRIPTION OF THE DRAWINGS

FIG. 2 is a table showing operation of different software to control the e-pump under various test conditions;

FIG. 3 is a table showing comparative auto start testing; and

DESCRIPTION OF THE PREFERRED EMBODIMENTS

For a vehicle, initial startup in extreme cold temperatures may be difficult due to the loads on the electronic pump (e-pump) that pumps fluid, such as fluid for the vehicle transmission or the like. For example, at ambient temperatures below around −20 degrees Celsius, the viscosity of the fluid the e-pump is trying to move is so high that the torque of the e-pump motor is insufficient to achieve the desired speed of 800 RPM. The only way for the e-pump to overcome this high viscosity is to warm the fluid and therefore reduce the viscosity. Heat generated in the motor windings is transferred from the motor/pump to the fluid (such as via conductive heat transfer from the motor/pump to the transmission at which it is attached). This is achieved by implementing a "heater mode" in the e-pump software.

When the e-pump software detects two consecutive motor stalls during start-up and the ECU temperature is below a threshold temperature, such as, for example, zero degrees Celsius, the software changes to a "heater mode" state. While in the "heater mode" state, the software applies current through the motor windings, such as by forcing evenly distributed current through the motor windings by commutating at a rate of one commutation every 25 milliseconds for one second at max phase current for a total of 40 commutations. After a threshold period of time, such as, for example, one second, the software exits the "heater mode" state and returns to start-up and attempts to turn the motor. This process is repeated until the ECU temperature goes above zero degrees Celsius or until the motor spins successfully without detecting a stall condition.

Figure 1:
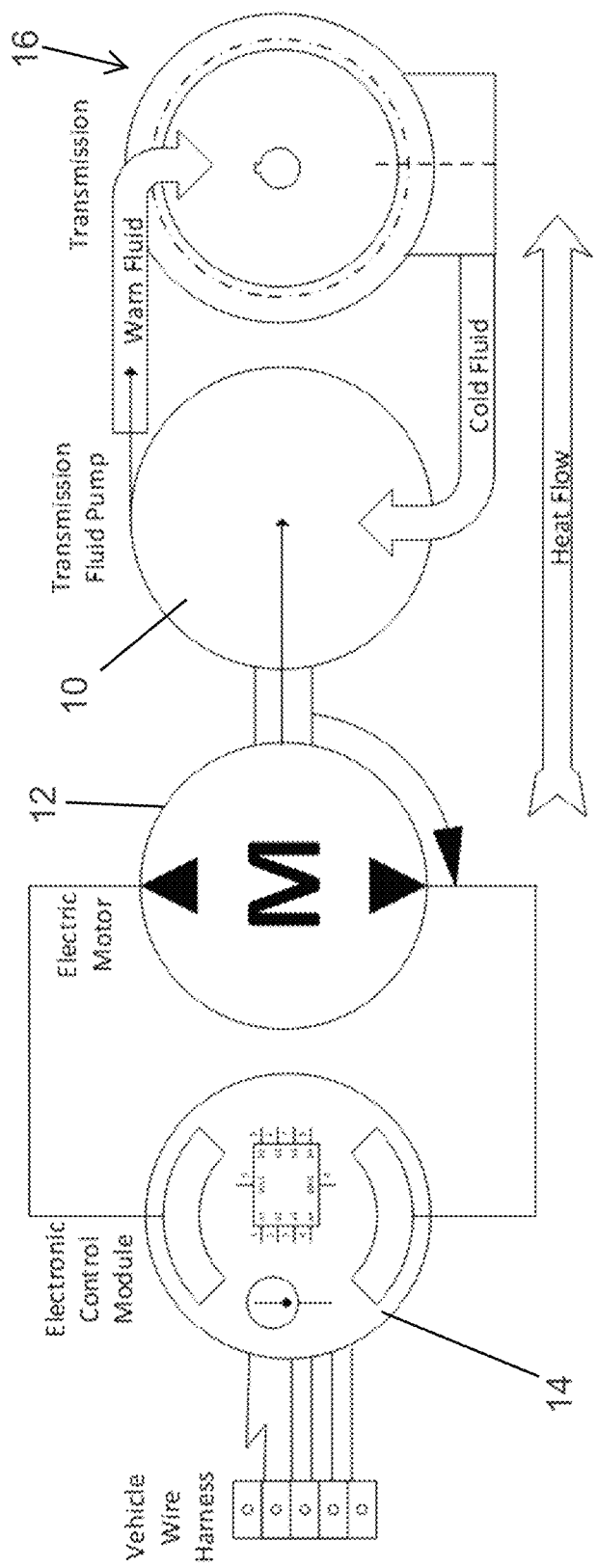
FIG. 1 is a schematic showing a cold temperature start-up system that transfers heat from an electric motor windings to the transmission fluid in accordance with the present invention.
Figure 4:
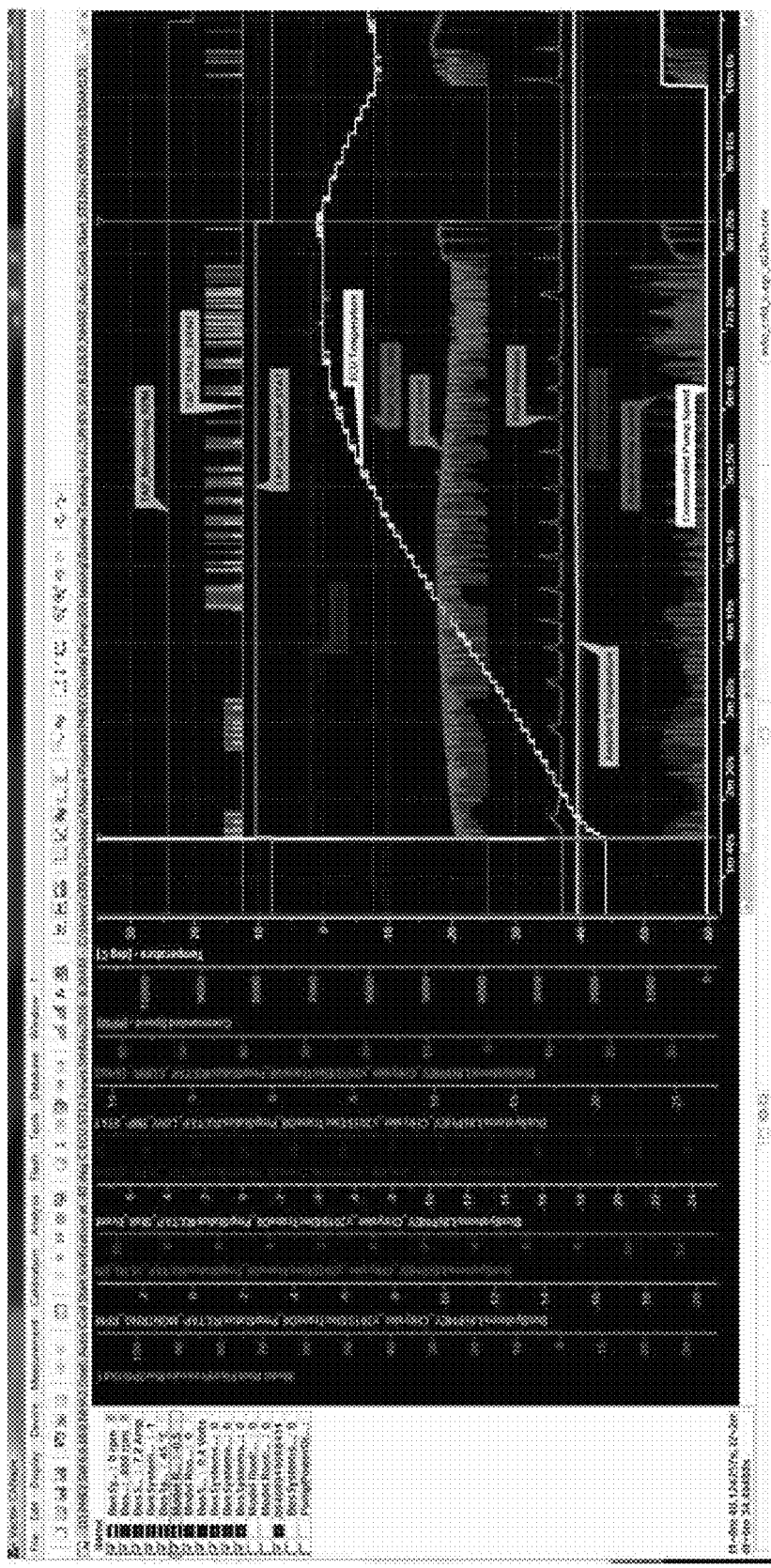
FIG. 4 is a graph showing temperatures of components over time.

The system of the present invention is suitable for heating transmission fluid for a transmission oil pump. In the illustrated embodiment, and such as shown in FIG. 1, the system includes an oil pump assembly or system that comprises a pump 10, a motor 12 and an electronic control unit 14 (which is electrically connected to a vehicle wire harness or electrical connection), and the assembly may be attached at (such as bolted to) the transmission 16. When the transmission fluid is very cold, the pump is not able to move the oil and thus the fluid or oil must be heated in order to achieve fluid flow.

When current is forced thru the motor windings by the ECU, the motor generates heat. Because the metallic motor/pump housing is attached or bolted directly to the transmission, the metallic transmission housing and the oil or fluid in the transmission functions as a large heat sink for the pump. Also, the small amount oil or fluid inside the pump is heated relatively quickly. The pump is then able to force this oil or fluid out of the pump and draw in much cooler fluid. As this process is repeated, heat is removed from the pump and the oil or fluid in the transmission is warmed by the pump.

Therefore, the control system of the present invention is responsive to the ambient temperature at or near the vehicle or ECU temperature or fluid temperature (such as responsive to a temperature sensor at the vehicle or ECU or fluid) or temperature that would be indicative of the fluid temperature (such as a temperature at the transmission body or at the motor or the like) and a motor output indicative of the motor RPMs and/or a stall condition of the motor. When the sensed temperature is below a threshold level (such as, for example, zero degrees C. or −10 degrees C. or −20 degrees C.), and the system receives an input indicative of at least one stall condition of the motor (such as two or more stalls of the motor), the system operates in the heater mode and operates the motor to generate heat in the motor windings and to conductively transfer the generated heat from the motor/pump to the fluid (such as via any suitable thermal conductive element or connection or contact between the motor and pump to heat the fluid in the pump and thus to heat the fluid in the transmission as fluid is cycled through the pump).

After the generated heat is transferred (such as after a threshold time of operating in the heater mode or after the temperature of the fluid reaches or exceeds a threshold temperature), the system returns to the start-up mode and attempts to start the motor. If the motor again stalls (and the temperature at the ECU or motor or fluid is below a threshold level), then the system again enters the heater mode and generates heat and transfers the heat to the fluid, and then again returns to the start-up mode to re-attempt to start the motor. This process is repeated until either the motor starts successfully and does not stall or the sensed temperature is above the threshold level.

The present invention thus provides a system that drives current through an electric motor windings with the primary purpose of generating heat. The motor torque that is generated may provide a secondary function while in the heating mode. By generating heat and applying the heat at the fluid (such as the transmission fluid), the generated heat lowers the viscosity of the fluid at start up. The system or control may function to commutate at regular intervals to distribute the generated heat evenly. For example, the rate of commutation and the amperage level may be based on the thermal properties of the motor windings. The system may further operate to periodically or episodically test or determine the fluid temperature and/or viscosity, and may switch back to generating torque on a regular basis to determine if the temperature of the fluid has been increased enough or the viscosity of the fluid has been lowered enough for successful normal operation of the pump.

Changes and modifications in the specifically described embodiments may be carried out without departing from the principles of the present invention, which is intended to be limited only by the scope of the appended claims as interpreted according to the principles of patent law.

The invention claimed is:

1. A system for starting a vehicle in cold temperatures, said system comprising:
   a temperature sensor disposed at the vehicle;
   a motor operable to drive at least one electrically operated pump to pump fluid, wherein said motor provides a motor signal indicative of an operating condition of the motor;
   wherein, responsive to (i) a temperature sensed by said temperature sensor being below a threshold level and (ii) the motor signal being indicative of a stall condition of the motor, said system enters a fluid heating mode; and
   wherein, when operating in the fluid heating mode, said system generates heat in the windings of the motor to conductively transfer heat from the motor to the fluid being pumped by the pump.

2. The system of claim 1, wherein, after heat is conductively transferred to the fluid, said system operates in a startup mode to start the motor.

3. The system of claim 2, wherein said system switches from the fluid heating mode to the startup mode following a threshold period of time after entering the fluid heating mode.

4. The system of claim 2, wherein, when operating in the startup mode, said system attempts to start the motor and switches back to the fluid heating mode if (i) the temperature sensed by said temperature sensor is below the threshold level and (ii) the motor signal is indicative of a stall condition of the motor.

5. The system of claim 1, wherein said system generates heat in the windings of the motor by forcing evenly distributed current through the motor windings.

6. The system of claim 5, wherein said system generates heat in the windings by commutating at a rate of one commutation every 25 milliseconds for one second at max phase current for a total of 40 commutations.

7. The system of claim 1, wherein said motor is operable to drive said pump to pump transmission fluid for a transmission of the vehicle.

8. The system of claim 7, wherein said motor and said pump are attached at the transmission of the vehicle.

9. The system of claim 1, wherein said temperature sensor is operable to sense a fluid temperature of the fluid.

10. A system for starting a vehicle in cold temperatures, said system comprising:
    a control unit;
    a temperature sensor disposed at the vehicle, wherein said temperature sensor senses a temperature at the vehicle and provides a temperature signal indicative of the sensed temperature;
    a motor operable to drive at least one electrically operated pump to pump fluid, wherein said motor provides a motor signal indicative of an operating condition of the motor;
    wherein said control unit, responsive to (i) the temperature signal being indicative of a sensed temperature being below a threshold level and (ii) the motor signal being indicative of a stall condition of the motor, said control unit enters a fluid heating mode;
    wherein, when operating in the fluid heating mode, said control unit applies current through the motor windings to generate heat, and wherein the generated heat is conductively transferred from the motor to the fluid being pumped by the pump; and
    wherein, after heat is conductively transferred to the fluid, said control unit operates in a startup mode to start the motor to pump the fluid.

11. The system of claim 10, wherein said control unit switches from the fluid heating mode to the startup mode following a threshold period of time after entering the fluid heating mode.

12. The system of claim 10, wherein, when operating in the startup mode, said control unit attempts to start the motor and switches back to the fluid heating mode if (i) the temperature signal is indicative of a sensed temperature below the threshold level and (ii) the motor signal is indicative of a stall condition of the motor.

13. The system of claim 10, wherein said control unit generates heat in the windings of the motor by forcing evenly distributed current through the motor windings.

14. The system of claim 10, wherein said motor is operable to drive said pump to pump transmission fluid for a transmission of the vehicle, and wherein said motor and said pump are attached at the transmission of the vehicle.

15. The system of claim 10, wherein said temperature sensor is operable to sense one of (i) a temperature at said control unit, and (ii) a fluid temperature of the fluid.

16. A system for starting a vehicle in cold temperatures, said system comprising:
- a control unit;
- a temperature sensor disposed at the vehicle, wherein said temperature sensor senses a temperature at the vehicle and provides a temperature signal indicative of the sensed temperature;
- a motor operable to drive at least one electrically operated pump to pump transmission fluid for a transmission of the vehicle, wherein said motor provides a motor signal indicative of an operating condition of the motor;
- wherein said temperature sensor is operable to sense a temperature indicative of a fluid temperature of the fluid;
- wherein said control unit, responsive to (i) the temperature signal being indicative of a sensed temperature being below a threshold level and (ii) the motor signal being indicative of a stall condition of the motor, said control enters a fluid heating mode;
- wherein, when operating in the fluid heating mode, said control unit applies current through the motor windings to generate heat, and wherein the generated heat is conductively transferred from the motor to the transmission fluid being pumped by the pump; and
- wherein, after heat is conductively transferred to the fluid, said control unit operates in a startup mode to start the motor to pump the transmission fluid.

17. The system of claim 16, wherein said control unit switches from the fluid heating mode to the startup mode following a threshold period of time after entering the fluid heating mode.

18. The system of claim 16, wherein, when operating in the startup mode, said control unit attempts to start the motor and switches back to the fluid heating mode if (i) the temperature signal is indicative of a sensed temperature below the threshold level and (ii) the motor signal is indicative of a stall condition of the motor.

19. The system of claim 16, wherein said control unit generates heat in the windings of the motor by forcing evenly distributed current through the motor windings.

20. The system of claim 16, wherein said temperature sensor is operable to sense one of (i) a temperature at said control unit, and (ii) a fluid temperature of the fluid.

\* \* \* \* \*